United States Patent [19]
Weis

[11] 3,750,969
[45] Aug. 7, 1973

[54] COIL WINDING MACHINE
[76] Inventor: William B. Weis, 1511 Indian Rocks Rd., Largo, Fla. 33540
[22] Filed: Aug. 17, 1970
[21] Appl. No.: 64,294

Related U.S. Application Data
[63] Continuation-in-part of Ser. No. 865,878, Oct. 13, 1969, abandoned.

[52] U.S. Cl. .................................. 242/1.1 R, 74/23
[51] Int. Cl. ......................................... H02k 15/085
[58] Field of Search ...................... 242/1.1 H, 1.1 E; 74/23

[56] References Cited
UNITED STATES PATENTS

| | | | |
|---|---|---|---|
| 3,257,082 | 6/1966 | Weis | 242/1.1 R |
| 3,411,725 | 11/1968 | Biddison | 242/1.1 R |
| 2,640,652 | 6/1953 | Harvey | 242/1.1 R |
| 3,052,418 | 9/1962 | Gorski et al. | 242/1.1 R |

Primary Examiner—Billy S. Taylor

[57] ABSTRACT

The apparatus for quickly, easily and accurately varying the configuration and plane of the elliptical path of the needle of a semi-automatic stator-coil winding machine. The machine includes a rotary movement section and an elliptical movement section arranged in cooperation with one another such that a rotary movement is translated into an elliptical movement to drive a wire-carrying needle about the perimeter of a stator-coil and thereby wind it. By varying the elliptical path of the needle, the apparatus of this invention substantially improves the capability of the machine to wind coils of different configurations.

8 Claims, 14 Drawing Figures

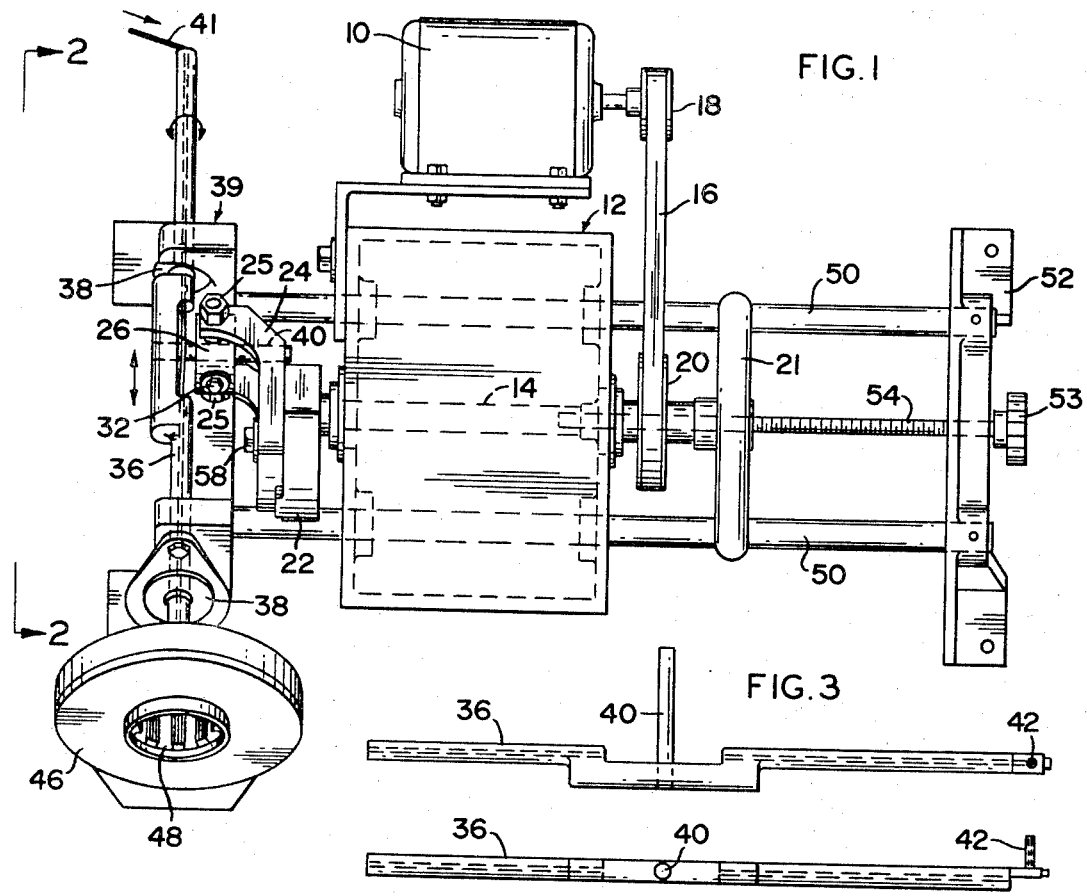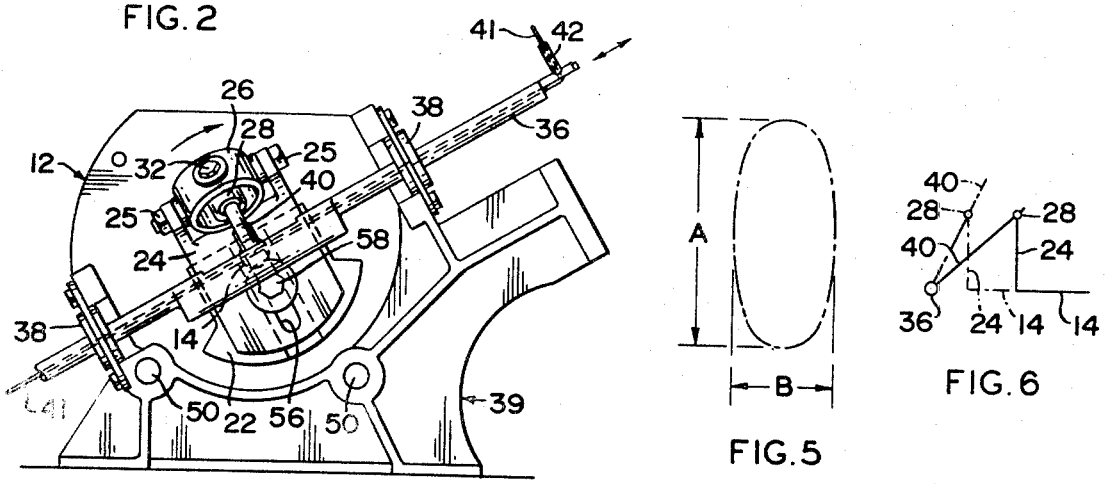

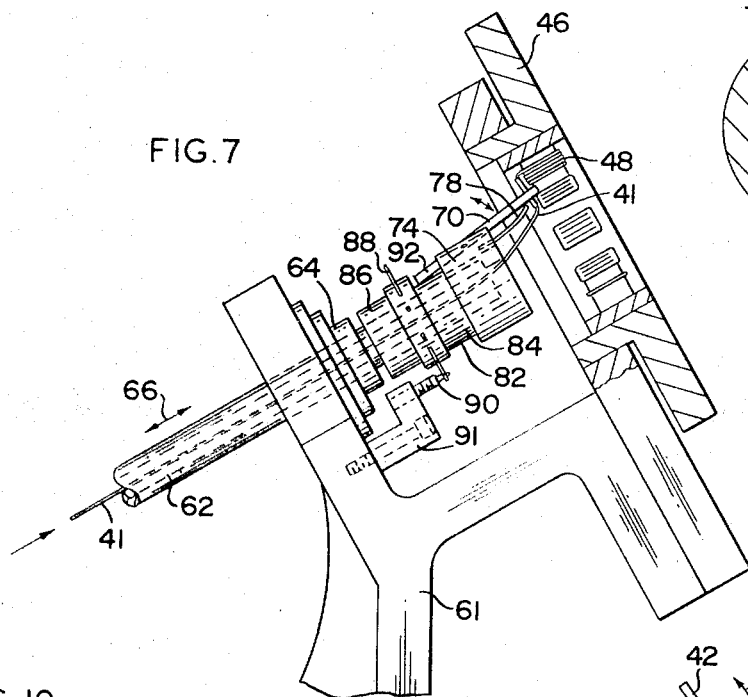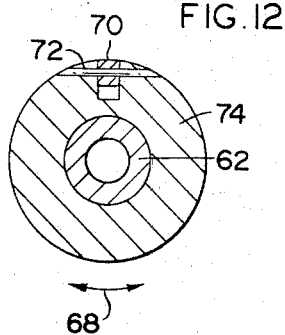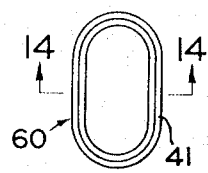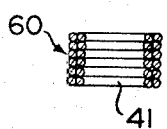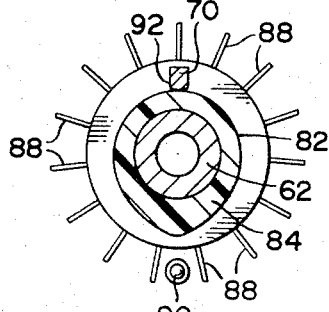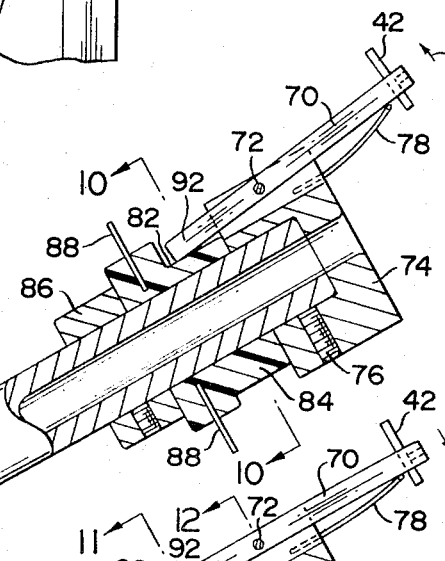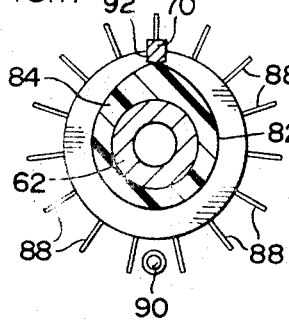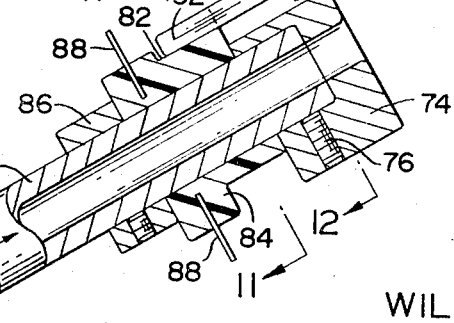

COIL WINDING MACHINE

This is a continuation-in-part application of my copending application, Ser. No. 865,878 filed Oct. 13, 1969 for a Coil Winding Machine, now abandoned.

This invention relates to a semi-automatic stator-coil winding machine of the type shown in my U.S. Pat. No. 3,257,082; more specifically, this invention relates to an apparatus for quickly and accurately varying the elliptical path of the coil-winding winding needle of this machine.

In my U.S. Pat. Nos; 3,179,346 and 3,257,082, both of which are incorporated by reference into this application, I disclosed my machine for winding electric stators.

In the operation of the machine, a rotary movement is translated into an elliptical movement to drive a wire-carrying needle about the perimeter of a stator-coil, thereby winding it. In small multi-pole stators, the cores of the stators are spaced relatively close together. Because of this, when designing the machine, it was thought necessary to create a mechanical movement that would guide the needle along a straight path as it moved between the cores. To accomplish this, the mechanical movement included a guide bar, cams, springs, and other components which made the movement more complicated and costly. Since then, it has been found that this is unnecessary. If moved in a slight arc, the needle can still wind the cores effectively without contacting the stator cores. Therefore, the movement has been modified to eliminate the above components.

The modified machine has been extraordinarily effective in winding stator coils effectively and economically. Disadvantages of the machine include the inability to quickly and accurately adjust the size and shape of the elliptical path and to vary the plane of the path so that the cores can be wound in a plurality of layers. Consequently, a large amount of time is consumed in setting up the machine, when changing over from winding one core to another of a different configuration. Moreover, in winding some cores, the elliptical path cannot be adjusted to conform to the perimeter of the core, as closely as it should. In addition, no means has yet been provided for efficiently and automatically winding stator cores in a plurality of different layers thereby varying the shape of the coil.

Therefore, it is a primary object of this invention to provide an apparatus for quickly, easily and accurately varying the elliptical path of the needle.

Another object is to provide an apparatus for changing the swing of the needle independently of its stroke.

Still another object is to provide an apparatus for changing the stroke of the needle without substantially changing its swing.

A further object is to provide an apparatus for automatically vary the plane of the elliptical path of the needle.

Another object is to provide an apparatus which is simply operated, yet practical and economically feasible to manufacture.

Other objects of the invention will in part be obvious and will in part appear hereinafter.

Briefly summarizing the invention, the apparatus essentially comprises a carriage, for changing the swing of the needle independently of its stroke, and an adjustable clevis, for changing the stroke of the needle without substantially changing its swing.

The carriage consists of two parallel bars on which the rotary movement section of the machine is slidably mounted toward or away from the needle bar. Owing to the particular arrangement between the needle bar and the rotary movement, as the latter is brought closer to the needle bar, the swing of the needle is increased — independently of its stroke — and conversely, as it moves further away, the swing is decreased. Because of a finite adjustment means, the swing can be accurately adjusted in minute increments.

The adjustable clevis is connected to the rotary movement and supports a universal joint to which the needle bar is coupled. It is radially adjustable by being slotted and by being connected by a bolt extending through the slot. The stroke of the needle is varied by changing the radial distance of the universal joint simply by loosening the bolt and sliding the clevis. As the universal joint is extended outwardly, the stroke of the needle will be progressively greater.

The apparatus may also comprise means to automatically vary the plane of the path of the needle in order to wind the core in a plurality of layers. This means comprises a cam specifically shaped to regulate the position of the needle. The needle bar on which the needle is mounted is biased into operative engagement with the cam surface. The plane of the path of the needle may be adjusted due to pivotal movement of the cam upon rotation of the cam. The cam is automatically rotated or indexed in step like manner by periodic engagement of a shot pin with the cam during the reciprocal movement of the center shaft on which the cam and needle bar are mounted. It is important to note that by varying the configuration of the cam surface, the configuration of the coil to be formed can be changed.

The invention accordingly comprises the features of construction, combination of elements, and arrangement of parts which will be exemplified in the construction hereinafter set forth and the scope of the invention will be indicated in the claims.

For a fuller understanding of the nature and objects of the invention, reference should be had to the following detailed description taken in connection with the accompanying drawing in which:

FIG. 1 is a top view of the coil winding machine on which the apparatus of this invention is installed.

FIG. 2 is an end view of the machine taken along the lines 2—2 of FIG. 1 with the stroke of the needle bar up 90° from that shown in FIG. 1 and with the stator and its accompanying support removed.

FIG. 3 is an elevation view of the needle bar.

FIG. 4 is a bottom view of the needle bar shown in FIG. 3.

FIG. 5 is a diagrammatic view of the elliptical path of the needle.

FIG. 6 is a diagrammatic view illustrating how the swing of the needle is increased as the rotary movement section is brought closer to the needle bar.

FIG. 7 is a side elevation view of an embodiment including means to periodically adjust the position of the needle so as to provide a coil wound in layers.

FIGS. 8 and 9 show sectional views of different positions of the needle and needle bar operating in cooperative engagement with the cam.

FIG. 10 is a sectional view of the cam taken along line 10—10 of FIG. 8.

FIG. 11 is a sectional view of the cam taken along lines 11—11 of FIG. 9.

FIG. 12 is a sectional view of the center shaft and attached needle post taken along lines 12—12 of FIG. 9.

FIG. 13 is a top plan view of the layered coil structure.

FIG. 14 is a sectional view of the coil structure taken along lines 14—14 of FIG. 13.

Similar reference characters refer to similar parts throughout the several views of the drawing.

Referring now to the figures in detail, the general operation of the machine, particularly the translation of the rotary movement to the elliptical movement will first be described.

To facilitate discussion, the machine may be considered to be comprised of two basic sections: a rotary movement section and an elliptical movement section. The rotary movement section comprises those parts which rotate or support rotation; and similarly, the elliptical movement section comprises those parts which move elliptically or support this movement.

The rotary section, as seen in FIGS. 1 and 2, includes a motor 10 mounted on a housing 12. The housing journals, through suitable bearings, a drive shaft 14 rotated by the motor through a drive belt 16 and drive pulleys 18 and 20. For manual rotation of the drive shaft, a hand wheel 21 is provided.

Keyed to the open end of the drive shaft is a counterweight 22 for dynamically balancing a clevis 24 bolted to the open end of the counterweight.

Freely pivotable on opposing bolts 25 on the U-shaped arms at the end of the clevis, and eccentric to the axis of the drive shaft 14, is the outer ring 26 of a universal joint. In addition to the outer ring, the universal joint consists of a bushing 28 centrally positioned within ring 25 by opposing bolts 32, mounted in suitable bearings so the bushing will freely rotate. The axis, bolts 25 on which the bushing pivots is designated its horizontal axis; and the axis, bolts 32, on which the bushing rotates is designated its vertical axis. It should be obvious that when the drive shaft 14 rotates, counterweight 22, clevis 24, and the universal joint are all rotatably carried with the shaft.

The elliptical section included a needle bar 36 reciprocally and rotatively supported within bearings 38 on a stationary frame 39. The needle bar 36, more clearly seen in FIGS. 3 and 4, has an offset central portion to which a perpendicular, rigid coupling rod 40 is firmly attached. The purpose of the offset central portion is explained below. The free end of the coupling rod is coupled to bushing 28, as shown, by being slidably retained therein. The needle bar is hollow to receive a coiling wire 41 at one end and to disperse it through a coil-winding needle 42 at its other end. In FIG. 1, there is also shown in combination with an indexing mechanism 46, a typical electric stator 48. The stator is suitably mounted with respect to the needle such that as the needle moves in an elliptical path, in coiling wire 41 on a stator core 48, the needle substantially follows the perimeter of the core.

To move the needle in an elliptical path, as shown in FIG. 5, the rotary movement is translated into an elliptical movement. In understanding this, it is helpful to recall the following basic concepts. The needle bar is journalled to reciprocate and rotate. Its coupling rod 40 is perpendicular, and because it is slidably retained in bushing 28, it also rotates with the bushing. Bushing 28 rotates with the drive shaft 14 in a plane that is parallel to the longitudinal axis of the needle bar. Since the center line of the drive shaft 14 intersects the longitudinal axis of the needle bar, the rotation of bushing 28 is also symmetrical about this axis. Because of the universal joint, the horizontal and vertical axis of the bushing are always perpendicular to the longitudinal axis of coupling rod 40 as the bushing rotates.

Keeping these basic concepts in mind, as the bushing rotates with the drive shaft, force components acting on the coupling rod through the bushing cause the needle bar to simultaneously reciprocate and oscillate. A force component that is parallel with the longitudinal axis of the needle bar reciprocates the bar between an uppermost position, when the vertical axis of the bushing is parallel to the longitudinal axis of the bar and above rod 40, to a lowermost position, when the vertical axis of the bushing is parallel to the longitudinal axis of the bar and below rod 40 (shown in FIG. 1). The distance the needle moves between these positions is defined as the stroke of the needle; it is designated "A" in FIG. 5.

A force component that is perpendicular to the above force component oscillates the needle bar. In oscillating, the bar swings from a neutral point, when the vertical axis of the bushing is parallel to the longitudinal axis of the bar, to maximum arcs, that occur when the vertical axis of the bushing is perpendicular to the longitudinal axis of the needle bar: a maximum left arc when the bushing is above the needle bar (FIG. 2), and a maximum right arc when the bushing is below the bar. The distance the needle moves between these maximum arcs is defined as the swing of the needle — designated "B" in FIG. 5.

The simultaneous reciprocation and oscillation of the needle bar moves the needle in an elliptical path shown in FIG. 5.

The apparatus of this invention varies the elliptical path of the needle by adjusting the stroke and swing of the needle. For adjustment of the swing, the rotary movement section is slidably mounted on two parallel bars 50 secured to a foundation frame 52. It is moved along the bars by rotating the handle 53 of an adjusting rod 54 threaded to frame 52 and attached to housing 12. Although this is the preferred manner of moving the rotary section, it should be obvious that other devices may be utilized.

As the rotary section is moved toward the needle bar, coupling rod 40 extends farther through the bushing 28, and, for any given radial position of the bushing — except when its vertical axis is parallel to the longitudinal axis of the needle bar — the rod swings in a greater arc. This is easily seen by the diagrammatic view of FIG. 6, a view looking downwardly at the needle bar with the bushing in a position as shown in FIG. 2. The solid lines represent a first position of the rotary section, and the phantom lines represent a position closer to the needle bar.

It should be easily understood that as the coupling rod is swung to a greater arc, the swing of the needle bar and the needle will correspondingly be increased. The swing will be at a theoretical maximum when the spherical center line of the bushing lines in a plane passing through the longitudinal axis of the needle bar. Theoretically, a maximum swing of 180° should be possible. The offset central portion of the needle bar allows the bushing to come as close as possible to this longitudinal axis so that the swing may come as close to maximum as possible.

Conversely, when the rotary section is moved away from the needle bar, the swing of the needle will be decreased. The stroke of the needle is unaffected by the movement of the rotary section on the carriage since the radial distance of the bushing remains unchanged.

In an alternate construction, the elliptical section could be slidable relative to a stationary rotary movement section to accomplish the same result. It should be understood however, that the illustrated construction is preferred.

To vary the stroke of the needle, clevis 24 has a slot 56 running substantially along its radial length. A bolt 58 extends through the slot while bolting the clevis to the counter-weight. Loosening the bolt and sliding the clevis outwardly increases the radius of the circular path defined by the rotation of the bushing. Conversely, moving the clevis inwardly decreases the stroke of the needle. Although not to the same degree, the swing "B" of the needle is also effected by changing the radial distance of the bushing. Therefore, after the stroke is adjusted, to maintain a given "swing setting," it is necessary to readjust the swing by rotating handle 53.

As shown in the embodiment of FIG. 7 the apparatus of the subject invention is also capable of forming coils 60 in a desired configuration about core 48. More specifically, wire 41 is arranged in layers, which may or may not be evenly spaced about core 48. This layered winding may be accomplished by a winding assembly which comprises frame 61 supporting a central tube 62 journalled in bearing 64 so as to be capable of both reciprocal or oscillating movement about the longitudinal axis of tube 62. For clarity, this reciprocal movement is indicated by arrow 66 and the oscillation by arrow 68 in FIG. 12.

Needle bar 70 is pivotally attached by means of pivot pin 72 to a needle post 74. The needle post itself is fixedly attached by set screw 76 to one extremity of the central tube 62. A spring 78 is mounted on needle post 74 so as to bias needle bar 70 in a counter clockwise direction about pivot pin 72 as shown by arrow 80 in FIG. 8. This biasing force causes needle bar 70 to cooperatively engage cam surface 82 of cam 84. The cam 84 is mounted on central tube 62 by means of a trust ring 86 which serves to sandwich cam 84 between the ring 86 and needle post 74. Cam 84 and central tube 62 are arranged so as to rotationally move relative to one another about the longitudinal axis of tube 62.

Rotation of cam 84 occurs due to the cooperation between spokes 88, attached to the cam. The shot pin 90 is threadedly attached to a support block 91 which itself is secured to mounting frame 61. As can be readily seen, the movement of central tube 62 is equivalent to that of needle bar 36 shown in FIG. 2. More specifically, rotation of central tube 62 which defines the swing "B" (FIG. 5) occurs at each end of stroke "A." Accordingly, when central tube 62 is at the end of the stroke corresponding to its longitudinally inward most position, rotation of central tube 62 occurs. Engagement between pin 90 and one of the spokes 88 forces cam 84 to be maintained in a fixed position relative to pin 90 and thereby allows relative rotational movement between central tubes 62 and cam 84. In that needle bar 70 is caused to rotate along with central tube 62, an extremity 92 of the needle bar 70, which cooperates with the cam surface 82 is caused to be raised or lowered in cooperation with the configuration of surface 82. This of course alters the position of needle 42 and accordingly alters the plane of the path the needle 42 will follow when winding wire 41 about core 48. This of course has the effect of placing wire 41 in different layers as shown in FIGS. 13 and 14.

Referring specifically to FIGS. 10 and 11 extremity 92 is shown in cooperative engagement with different portions of cam surface 84 wherein the needle 42 may be raised or lowered to different heights as shown in FIGS. 8 and 9 respectively.

While FIGS. 13 and 14 show coil 60 being wound in evenly arranged layers, it is important to note that the configuration of coil 60 is dependent upon the specific configuration of cam surface 82. Therefore, cam surface 82 may be arranged to form any configuration of coil 60 due to its cooperation with extremity 92 of needle bar 70.

It should now be evident that a novel and remarkably simple apparatus has been invented to vary both the configuration and the plane of the elliptical path of the needle. The stroke of the needle is varied simply by loosening the clevis and moving it until the desired stroke is obtained. Advantageously, the swing of the needle may be adjusted without effecting the stroke merely by rotating handle 53. The plane of the needle's path can be automatically varied by cooperation between a cam 84 and the needle bar 70. As a result, the machine can be quickly changed over when winding coils of different configurations. Viewing its simplicity, the apparatus is also extremely practical and economically feasible to manufacture.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described:

What is claimed is:

1. A coil winding machine comprising a rotary movement section, an elliptical movement section, said elliptical movement section including a center shaft, means coupling said elliptical movement section to said rotary movement section for translation of rotary movement into elliptical movement, said elliptical movement section including a needle bar, a coil winding needle connected to said needle bar, said needle bar pivotally mounted on said center shaft so as to be movable by said elliptical section, a cam means rotatably mounted on said center shaft and engaging said needle bar so that relative movement of said cam means to said center shaft varies the position of said needle relative to said center shaft, adjusting means movably interconnecting said rotary movement section and said elliptical movement section whereby the stroke of said needle and movement of both sections is varied, carriage means connected to said rotary and elliptical movement section, at least one of said sections being movable thereon so as to move said one section relative to the other and thereby vary the swing of said needle when in operation.

2. A coil winding machine as in claim 1 further comprising a cam adjusting means fixedly positioned on said machine and oriented to periodically engage said cam means, whereby said cam means is caused to periodically rotate relative to said center shaft upon engagement with said cam adjusting means.

3. A coil winding machine as in claim 1 wherein said cam means includes a cam surface having a predetermined configuration, said needle bar having at least one end thereof positioned in movable engagement with said cam surface; said cam means fixedly mounted on said shaft in a co-linear direction relative to the longitudinal axis of said center shaft and rotationally movable about the longitudinal axis of said center shaft.

4. A coil winding machine as in claim 1 wherein said needle is mounted on the extremity of said needle bar opposite to said cam means whereby movement of said cam means relative to said needle bar varies the position of said needle relative to said center shaft.

5. A coil winding machine as in claim 4 further comprising biasing means interconnected to said center shaft and positioned in biasing engagement with said cam means, said cam means including a cam surface disposed in operative engagement with said needle bar and having a predetermined configuration, whereby the configuration of said surface determines the position of said needle relative to said center shaft.

6. A coil winding machine as in claim 1 wherein said carriage means comprises a pair of parallel bars, said rotary section slidably mounted for movement on said bars relative to the elliptical movement section, and means for moving said carriage.

7. A coil-winding machine of claim 6 wherein the means for moving the carriage comprises a rod threaded to the frame and attached to a portion of the rotary section.

8. A coil winding machine as in claim 7 wherein the adjustment means comprising a slotted clevis on which a universal joint is supported, said clevis being bolted to the rotary movement section by a bolt through said slot.

* * * * *